(12) United States Patent
Fujihara et al.

(10) Patent No.: US 12,521,381 B2
(45) Date of Patent: Jan. 13, 2026

(54) ANTICOCCIDIAL AGENT AND METHOD FOR USING THE SAME

(71) Applicant: NIHON NOHYAKU CO., LTD., Tokyo (JP)

(72) Inventors: Hirokazu Fujihara, Kawachinagano (JP); Shunsuke Fuchi, Kawachinagano (JP); Yutaka Abe, Kawachinagano (JP)

(73) Assignee: NIHON NOHYAKU CO., LTD., Tokyo (JP)

( * ) Notice: Subject to any disclaimer, the term of this patent is extended or adjusted under 35 U.S.C. 154(b) by 508 days.

(21) Appl. No.: 18/012,768

(22) PCT Filed: Jul. 2, 2021

(86) PCT No.: PCT/JP2021/025130
§ 371 (c)(1),
(2) Date: Dec. 23, 2022

(87) PCT Pub. No.: WO2022/004877
PCT Pub. Date: Jan. 6, 2022

(65) Prior Publication Data
US 2023/0338350 A1  Oct. 26, 2023

(30) Foreign Application Priority Data

Jul. 3, 2020  (JP) .................. 2020-115725
Sep. 10, 2020  (JP) .................. 2020-151716

(51) Int. Cl.
A61K 31/4439  (2006.01)
A61P 33/02  (2006.01)

(52) U.S. Cl.
CPC .......... *A61K 31/4439* (2013.01); *A61P 33/02* (2018.01)

(58) Field of Classification Search
CPC ............................ A61K 31/4439; A61P 33/02
USPC ....................................................... 514/338
See application file for complete search history.

(56) References Cited

U.S. PATENT DOCUMENTS

| | | |
|---|---|---|
| 3,271,249 A | 9/1966 | Clegg et al. |
| 11,311,013 B2 | 4/2022 | Fujihara et al. |
| 2009/0105266 A1 | 4/2009 | Glatthar et al. |
| 2012/0101096 A1 | 4/2012 | Hedstrom et al. |
| 2012/0204545 A1 | 8/2012 | Mc Donald et al. |
| 2017/0210741 A1 | 7/2017 | Augelli-Szafran et al. |

FOREIGN PATENT DOCUMENTS

| | | |
|---|---|---|
| JP | 2004-51510 A | 2/2004 |
| WO | WO 2008/140239 A1 | 11/2008 |
| WO | WO 2009/051705 A1 | 4/2009 |
| WO | WO 2019/049061 A1 | 3/2019 |
| WO | WO 2019/225663 A1 | 11/2019 |

OTHER PUBLICATIONS

Partial Supplementary European Search Report for European Application No. 21831706.3, dated Jun. 3, 2024.
Indian Office Action for corresponding Indian Application No. 202317003783, dated Nov. 2, 2023. with English translation.
International Search Report, issued in PCT/JP2021/025130, PCT/ISA/210, dated Aug. 17, 2021.
Written Opinion of the International Searching Authority, issued in PCT/JP2021/025130, PCT/ISA/237, dated Aug. 17, 2021.
Canadian Office Action for Canadian Application No. 3,187,867, dated Jun. 6, 2024.
Cernak et al., "Microscale High-Throughput Experimentation as an Enabling Technology in Drug Discovery: Application in the Discovery of (Piperidinyl)pyridinyl-1H-benzimidazole Diacylglycerol Acyltransferase 1 Inhibitors," Journal of Medicinal Chemistry, vol. 60, 2017, pp. 3594-3605.
Database CAS Registry [Online], "Chemical Abstracts Service," Retrieved from STN, 2020, 4 pages total.
Extended European Search Report for European Application No. 21831706.3, dated Aug. 12, 2024.
Rose, "2-Aryl-substituted benzo-anellated 5-membered heterocycles as potential effectors in the cardiovascular system. Part 2. 1,3-Benzimidazole," Database CAPLUS [Online], Database Accession No. 1992:571308, 1991, 1 page total.
Savall et al., "Synthesis of 2-arylbenzimidazoles via microwave Suzuki-Miyaura reaction of unprotected 2-chlorobenzimidazoles," Tetrahedron Letters, vol. 49, 2008, pp. 6667-6669.
Chinese Office Action and Search Report for Chinese Application No. 202180045366.9, dated Jan. 11, 2024.

*Primary Examiner* — Charanjit Aulakh
(74) *Attorney, Agent, or Firm* — Birch, Stewart, Kolasch & Birch, LLP

(57) ABSTRACT

Developed and provided are: an anticoccidial agent, and a using method thereof, where the anticoccidial agent has an excellent anticoccidial activity and can eliminate or minimize mass outbreak of coccidioses. Thus, provided are: an anticoccidial agent containing, as an active ingredient, a benzimidazole compound represented by General Formula (1), or a salt of the compound, and a method for using the agent. General Formula (1) is expressed as follows:

[Chem. 1]

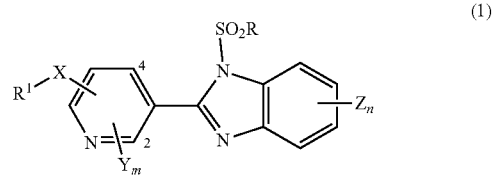

(1)

wherein $R^1$ typically represents haloalkyl; X typically represents oxygen; R typically represents alkyl; Y represents halogen; m denotes 0 or 1; Z represents alkyl or halogen; and n denotes 0, 1, or 2.

7 Claims, No Drawings

ANTICOCCIDIAL AGENT AND METHOD FOR USING THE SAME

TECHNICAL FIELD

The present invention relates to an anticoccidial agent containing a benzimidazole compound or a salt of the compound as an active ingredient, and a method for using the anticoccidial agent.

BACKGROUND ART

Coccidioses are known as one of protozoal parasitoses and are infectious diseases caused by Coccidian protozoans. Such coccidia typically infect poultry (domestic fowls) such as chickens, turkeys, ducks, quails, hybrids between a wild and a domestic duck, and cause symptoms such as gastrointestinal bleeding, growth suppression, or death. Such poultry is recently often bred intensively in large scale, and coccidiosis infection, if once spreads, invites large economic loss on commercial growers. To eliminate or minimize this, various anticoccidial agents such as sulfa drugs, nitrofuran agents, quinoline agents, antithiamine agents, benzamides, naphthoquinone derivatives (for example, Patent Literature (PTL) 1), and polyether antibiotics have been developed and used. These drugs, however, have narrow safety margins and are limited in dose and administration period. This is because, when materials such as meat or eggs derived from animals to which the drugs have been administered are ate by a human, the drugs remaining in the animals may transfer to the human body. Also disadvantageously, such drugs, if used over a long term, lead to occurrence of drug-resistant strains and suffer from lower drug efficacies.

In contrast, a kind of benzimidazole compounds or a salt of the compound is known as being usable as an agricultural and horticultural insecticidal and acaricidal agent, an ectoparasite control agent, or an endoparasite control agent (for example, PTL 2), but there is no description on anticoccidial efficacies of such compounds.

CITATION LIST

Patent Literature

PTL 1: Japanese Unexamined Patent Application Publication (JP-A) No. 2004-51510
PTL 2: PCT International Publication Number WO2019/225663

SUMMARY OF INVENTION

Technical Problem

Demands have been made to develop an anticoccidial agent that eliminates or minimizes defects in conventional techniques, has an excellent anticoccidial activity, and can prevent or minimize mass outbreak of coccidioses; and to develop a method for using the anticoccidial agent.

Solution to Problem

After intensive investigations to achieve the object, the inventors of the present invention have found that a benzimidazole compound represented by General Formula (1) having pyridyl bonded at the 2-position and having N-alkylsulfonyl, or a salt of the compound, not only has an excellent anticoccidial efficacy, but also can achieve the object. The present invention has been made on the basis of these findings.

Specifically, the present invention relates to the followings:

(1) An anticoccidial agent containing a benzimidazole compound represented by General Formula (1) or a salt of the compound as an active ingredient, where General Formula (1) is expressed as follows:

[Chem. 1]

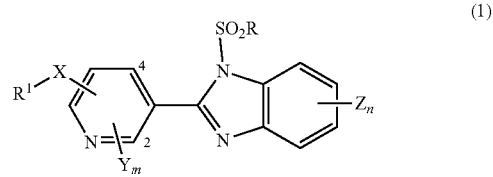

wherein:
R represents:
  (a1) $(C_1-C_8)$alkyl;
  (a2) $(C_3-C_8)$ cycloalkyl; or
  (a3) halo-$(C_1-C_8)$alkyl;
$R^1$ represents:
  (b1) $(C_1-C_8)$alkyl;
  (b2) halo-$(C_1-C_8)$alkyl;
  (b3) $(C_3-C_8)$ cycloalkyl;
  (b4) $(C_1-C_8)$alkoxy $(C_1-C_8)$alkyl;
  (b5) aryl; or
  (b6) aryl having one to five substituents selected from, identically or differently, (a) halogen, (b) $(C_1-C_6)$alkyl, (c) halo-$(C_1-C_6)$alkyl, (d) $(C_1-C_6)$alkoxy, (e) halo-$(C_1-C_6)$alkoxy, (f) $(C_1-C_6)$alkylthio, (g) halo-$(C_1-C_6)$alkylthio, (h) $(C_1-C_6)$alkylsulfinyl, (i) halo-$(C_1-C_6)$alkylsulfinyl, (j) $(C_1-C_6)$alkylsulfonyl, (k) halo-$(C_1-C_6)$alkylsulfonyl, and (l) trimethylsilyl;
X represents O, S, SO, $SO_2$, or $NR^2$ where $R^2$ represents hydrogen, $(C_1-C_6)$alkyl, $(C_1-C_6)$alkyl-carbonyl, $(C_1-C_6)$alkoxy-carbonyl, $(C_1-C_6)$alkylsulfonyl, or halo-$(C_1-C_6)$alkylsulfonyl; or
$R^2$ of $NR^2$ may combine with $R^1$ to form, with the nitrogen to which $R^2$ bonds, an unsubstituted or mono-substituted 5- to 8-membered saturated nitrogen-containing aliphatic heterocycle, where the substituent which the aliphatic heterocycle may have is ethoxycarbonyl or $(C_5-C_8)$alkylenedioxy, where the alkylenedioxy bonds to one carbon atom;
Y represents (c1) halogen;
m denotes 0 or 1;
Z represents, identically or differently in each occurrence:
  (d1) halogen; or
  (d2) $(C_1-C_8)$alkyl; and
n denotes 0, 1, or 2,
wherein none of the $(C_1-C_8)$alkylsulfonyl, $(C_1-C_8)$alkoxy $(C_1-C_8)$alkylsulfonyl, $(C_3-C_8)$ cycloalkylsulfonyl, and halo-$(C_1-C_8)$alkylsulfonyl is present at the 2-position and the 4-position of the pyridine ring;

(2) An anticoccidial agent containing the compound or a salt of the compound according to (1) as an active ingredient, wherein:
R is (a1) $(C_1-C_8)$alkyl;
$R^1$ is:
  (b1) $(C_1-C_8)$alkyl;
  (b2) halo-$(C_1-C_8)$alkyl;

(b3) $(C_3-C_8)$ cycloalkyl; or
(b6) aryl having one to five substituents selected from, identically or differently, (a) halogen, (b) $(C_1-C_6)$alkyl, (c) halo-$(C_1-C_6)$alkyl, (d) $(C_1-C_6)$alkoxy, (e) halo-$(C_1-C_6)$alkoxy, (f) $(C_1-C_6)$alkylthio, (g) halo-$(C_1-C_6)$alkylthio, (h) $(C_1-C_6)$alkylsulfinyl, (i) halo-$(C_1-C_6)$alkylsulfinyl, (j) $(C_1-C_6)$alkylsulfonyl, (k) halo-$(C_1-C_6)$alkylsulfonyl, and (l) trimethylsilyl;

X is O, S, or $NR^2$ where $R^2$ is as defined above;
Y is (c1) halogen;
m is 0 or 1;
Z is, identically or differently in each occurrence, (d1) halogen; or (d2) $(C_1-C_8)$alkyl;
n is 0, 1, or 2;

(3) An anticoccidial agent containing the benzimidazole compound or a salt of the compound according to (1) as an active ingredient, wherein:
R is (a1) $(C_1-C_8)$alkyl;
$R^1$ is (b1) halo-$(C_1-C_8)$alkyl; and
m is 0;

(4) An anticoccidial agent containing the benzimidazole compound or a salt of the compound according to (1) as an active ingredient, wherein:
R is (a1) $(C_1-C_8)$alkyl;
$R^1$ is (b1) halo-$(C_1-C_8)$alkyl;
m is 0;
Zs are, identically or differently in each occurrence, (d1) halogen; or (d2) $(C_1-C_8)$alkyl; and
n is 2;

(5) A method for using an anticoccidial agent, the method including administering an effective amount of the anticoccidial agent according to any one of (1) to (4) to a subject animal excluding humans;
(6) The method according to (5), wherein the subject animal is a bird;
(7) The method according to (5), wherein the subject animal is a chicken;
(8) A method for coccidial control, the method including administering the anticoccidial agent according to any one of (1) to (4) to a subject animal excluding humans;
(9) The method according to (8), wherein the subject animal is a bird;
(10) The method according to (8), wherein the subject animal is a chicken;
(11) A benzimidazole compound represented by General Formula (1-1), or a salt of the compound, where General Formula (1-1) is expressed as follows:

[Chem. 2]

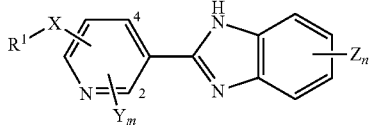

(1-1)

wherein:
$R^1$ represents:
(b1) $(C_1-C_8)$alkyl;
(b2) halo-$(C_1-C_8)$alkyl;
(b3) $(C_3-C_8)$ cycloalkyl;
(b4) $(C_1-C_8)$alkoxy $(C_1-C_8)$alkyl;
(b5) aryl; or
(b6) aryl having one to five substituents selected from, identically or differently, (a) halogen, (b) $(C_1-C_6)$alkyl, (c) halo-$(C_1-C_6)$alkyl, (d) $(C_1-C_6)$alkoxy, (e) halo-$(C_1-C_6)$alkoxy, (f) $(C_1-C_6)$alkylthio, (g) halo-$(C_1-C_6)$alkylthio, (h) $(C_1-C_6)$alkylsulfinyl, (i) halo-$(C_1-C_6)$alkylsulfinyl, (j) $(C_1-C_6)$alkylsulfonyl, (k) halo-$(C_1-C_6)$alkylsulfonyl, and (l) trimethylsilyl;

X represents O, S, SO, $SO_2$, or $NR^2$ where $R^2$ represents hydrogen, $(C_1-C_6)$alkyl, $(C_1-C_6)$alkyl-carbonyl, $(C_1-C_6)$alkoxy-carbonyl, $(C_1-C_6)$alkylsulfonyl, or halo-$(C_1-C_6)$alkylsulfonyl; or
$R^2$ of $NR^2$ may combine with $R^1$ to form, with the nitrogen to which $R^2$ bonds, an unsubstituted or mono-substituted 5- to 8-membered saturated nitrogen-containing aliphatic heterocycle, where the substituent which the aliphatic heterocycle may have is ethoxycarbonyl or $(C_5-C_8)$alkylenedioxy, where the alkylenedioxy bonds to one carbon atom;
Y represents (c1) halogen;
m denotes 0 or 1;
Z represents, identically or differently in each occurrence:
(d1) halogen; or
(d2) $(C_1-C_8)$alkyl; and
n denotes 0, 1, or 2,
wherein none of the $(C_1-C_8)$alkylsulfonyl, $(C_1-C_8)$alkoxy $(C_1-C_8)$alkylsulfonyl, $(C_3-C_8)$ cycloalkylsulfonyl, and halo-$(C_1-C_8)$alkylsulfonyl is present at the 2-position and the 4-position of the pyridine ring;

(12) The benzimidazole compound or a salt of the compound according to (11), wherein:
$R^1$ is:
(b1) $(C_1-C_8)$alkyl;
(b2) halo-$(C_1-C_8)$alkyl;
(b3) $(C_3-C_8)$ cycloalkyl; or
(b6) aryl having one to five substituents selected from, identically or differently, (a) halogen, (b) $(C_1-C_6)$alkyl, (c) halo-$(C_1-C_6)$alkyl, (d) $(C_1-C_6)$alkoxy, (e) halo-$(C_1-C_6)$alkoxy, (f) $(C_1-C_6)$alkylthio, (g) halo-$(C_1-C_6)$alkylthio, (h) $(C_1-C_6)$alkylsulfinyl, (i) halo-$(C_1-C_6)$alkylsulfinyl, (j) $(C_1-C_6)$alkylsulfonyl, (k) halo-$(C_1-C_6)$alkylsulfonyl, and (l) trimethylsilyl;

X is O, S, or $NR^2$ where $R^2$ is as defined above;
Y is (c1) halogen;
m is 0, or 1;
Z is, identically or differently in each occurrence, (d1) halogen; or (d2) $(C_1-C_8)$alkyl; and
n is 0, 1, or 2;

(13) The benzimidazole compound or a salt of the compound according to (11), wherein:
$R^1$ is (b1) halo-$(C_1-C_8)$alkyl; and
m is 0;

(14) The benzimidazole compound or a salt of the compound according to (11), wherein:
$R^1$ is (b1) halo-$(C_1-C_8)$alkyl;
m is 0; and
Zs are, identically or differently in each occurrence, (d1) halogen; or (d2) $(C_1-C_8)$alkyl; and
n is 2;

(15) An anticoccidial agent containing the benzimidazole compound or a salt of the compound according to any one of (11) to (14) as an active ingredient;
(16) A method for using an anticoccidial agent, the method including administering an effective amount of the anticoccidial agent according to (15) to a subject animal excluding humans;
(17) The method according to (16), wherein the subject animal is a bird;
(18) The method according to (16), wherein the subject animal is a chicken;

(19) A method for coccidial control, the method including administering the benzimidazole compound or a salt of the compound according to any one of (11) to (14) to a subject animal excluding humans;
(20) The method according to (19), wherein the subject animal is a bird; and
(21) The method according to (19), wherein the subject animal is a chicken.

Advantageous Effects of Invention

The benzimidazole compound having pyridyl bonded at the 2-position and having N-alkylsulfonyl, or a salt of the compound, according to the present invention has excellent efficacies as an anticoccidial agent. The present invention also provides an anticoccidial agent composition containing the anticoccidial agent, for domestic animals.

DESCRIPTION OF EMBODIMENTS

In the definitions of General Formulae (1) and (1-1) representing the benzimidazole compounds containing pyridyl bonded at the 2-position (and having N-alkylsulfonyl), or salts of the compounds, according to the present invention, the term "halo" means a "halogen atom" and refers to a fluorine, chlorine, bromine, or iodine atom.

The term "$(C_1-C_8)$alkyl" refers to a linear or branched alkyl group having 1 to 8 carbon atoms, such as methyl, ethyl, n-propyl, isopropyl, n-butyl, isobutyl, sec-butyl, tert-butyl, n-pentyl, isopentyl, tert-pentyl, neopentyl, 2,3-dimethylpropyl, 1-ethylpropyl, 1-methylbutyl, 2-methylbutyl, n-hexyl, isohexyl, 2-hexyl, 3-hexyl, 2-methylpentyl, 3-methylpentyl, 1,1,2-trimethylpropyl, 3,3-dimethylbutyl, n-heptyl, 2-heptyl, 3-heptyl, 2-methylhexyl, 3-methylhexyl, 4-methylhexyl, isoheptyl, or n-octyl. The term "$(C_2-C_8)$alkenyl" refers to a linear or branched alkenyl group having 2 to 8 carbon atoms, such as vinyl, allyl, isopropenyl, 1-butenyl, 2-butenyl, 2-methyl-2-propenyl, 1-methyl-2-propenyl, 2-methyl-1-propenyl, pentenyl, 1-hexenyl, 3,3-dimethyl-1-butenyl, heptenyl, or octenyl. The term "$(C_2-C_8)$alkynyl" refers to a linear or branched alkynyl group having 2 to 8 carbon atoms, such as ethynyl, 1-propynyl, 2-propynyl, 1-butynyl, 2-butynyl, 3-butynyl, 3-methyl-1-propynyl, 2-methyl-3-propynyl, pentynyl, 1-hexynyl, 3-methyl-1-butynyl, 3,3-dimethyl-1-butynyl, heptynyl, or octynyl.

The term "$(C_1-C_6)$alkyl" refers to a linear or branched alkyl group having 1 to 6 carbon atoms, such as methyl, ethyl, n-propyl, isopropyl, n-butyl, isobutyl, sec-butyl, tert-butyl, n-pentyl, isopentyl, tert-pentyl, neopentyl, 2,3-dimethylpropyl, 1-ethylpropyl, 1-methylbutyl, 2-methylbutyl, n-hexyl, isohexyl, 2-hexyl, 3-hexyl, 2-methylpentyl, 3-methylpentyl, 1,1,2-trimethylpropyl, or 3,3-dimethylbutyl.

The term "$(C_3-C_8)$cycloalkyl" refers to a cyclic alkyl group having 3 to 8 carbon atoms, such as cyclopropyl, cyclobutyl, cyclopentyl, cyclohexyl, cycloheptyl, or cyclooctyl. The term "$(C_1-C_8)$alkoxy" refers to a linear or branched alkoxy group having 1 to 8 carbon atoms, such as methoxy, ethoxy, n-propoxy, isopropoxy, n-butoxy, sec-butoxy, tert-butoxy, n-pentyloxy, isopentyloxy, tert-pentyloxy, neopentyloxy, 2,3-dimethylpropoxy, 1-ethylpropoxy, 1-methylbutoxy, n-hexyloxy, isohexyloxy, 1,1,2-trimethylpropoxy, n-heptyloxy, or n-octyloxy.

The term "$(C_3-C_6)$cycloalkyl" refers to a cyclic alkyl group having 3 to 6 carbon atoms, such as cyclopropyl, cyclobutyl, cyclopentyl, or cyclohexyl. The term "$(C_1-C_6)$alkoxy" refers to a linear or branched alkoxy group having 1 to 6 carbon atoms, such as methoxy, ethoxy, n-propoxy, isopropoxy, n-butoxy, sec-butoxy, tert-butoxy, n-pentyloxy, isopentyloxy, tert-pentyloxy, neopentyloxy, 2,3-dimethylpropoxy, 1-ethylpropoxy, 1-methylbutoxy, n-hexyloxy, isohexyloxy, or 1,1,2-trimethylpropoxy.

The term "$(C_1-C_8)$alkylthio" refers to a linear or branched alkylthio group having 1 to 8 carbon atoms, such as methylthio, ethylthio, n-propylthio, isopropylthio, n-butylthio, sec-butylthio, tert-butylthio, n-pentylthio, isopentylthio, tert-pentylthio, neopentylthio, 2,3-dimethylpropylthio, 1-ethylpropylthio, 1-methylbutylthio, n-hexylthio, isohexylthio, 1,1,2-trimethylpropylthio, n-heptylthio, or n-octylthio. The term "$(C_1-C_8)$alkylsulfinyl" refers to a linear or branched alkylsulfinyl group having 1 to 8 carbon atoms, such as methylsulfinyl, ethylsulfinyl, n-propylsulfinyl, isopropylsulfinyl, n-butylsulfinyl, sec-butylsulfinyl, tert-butylsulfinyl, n-pentylsulfinyl, isopentylsulfinyl, tert-pentylsulfinyl, neopentylsulfinyl, 2,3-dimethylpropylsulfinyl, 1-ethylpropylsulfinyl, 1-methylbutylsulfinyl, n-hexylsulfinyl, isohexylsulfinyl, 1,1,2-trimethylpropylsulfinyl, n-heptylsulfinyl, or n-octylsulfinyl. The term "$(C_1-C_8)$alkylsulfonyl" refers to a linear or branched alkylsulfonyl group having 1 to 8 carbon atoms, such as methylsulfonyl, ethylsulfonyl, n-propylsulfonyl, isopropylsulfonyl, n-butylsulfonyl, sec-butylsulfonyl, tert-butylsulfonyl, n-pentylsulfonyl, isopentylsulfonyl, tert-pentylsulfonyl, neopentylsulfonyl, 2,3-dimethylpropylsulfonyl, 1-ethylpropylsulfonyl, 1-methylbutylsulfonyl, n-hexylsulfonyl, isohexylsulfonyl, 1,1,2-trimethylpropylsulfonyl, n-heptylsulfonyl, or n-octylsulfonyl.

The term "$(C_1-C_6)$alkylthio" refers to a linear or branched alkylthio group having 1 to 6 carbon atoms, such as methylthio, ethylthio, n-propylthio, isopropylthio, n-butylthio, sec-butylthio, tert-butylthio, n-pentylthio, isopentylthio, tert-pentylthio, neopentylthio, 2,3-dimethylpropylthio, 1-ethylpropylthio, 1-methylbutylthio, n-hexylthio, isohexylthio, or 1,1,2-trimethylpropylthio. The term "$(C_1-C_6)$alkylsulfinyl" refers to a linear or branched alkylsulfinyl group having 1 to 6 carbon atoms, such as methylsulfinyl, ethylsulfinyl, n-propylsulfinyl, isopropylsulfinyl, n-butylsulfinyl, sec-butylsulfinyl, tert-butylsulfinyl, n-pentylsulfinyl, isopentylsulfinyl, tert-pentylsulfinyl, neopentylsulfinyl, 2,3-dimethylpropylsulfinyl, 1-ethylpropylsulfinyl, 1-methylbutylsulfinyl, n-hexylsulfinyl, isohexylsulfinyl, or 1,1,2-trimethylpropylsulfinyl. The term "$(C_1-C_6)$alkylsulfonyl" refers to a linear or branched alkylsulfonyl group having 1 to 6 carbon atoms, such as methylsulfonyl, ethylsulfonyl, n-propylsulfonyl, isopropylsulfonyl, n-butylsulfonyl, sec-butylsulfonyl, tert-butylsulfonyl, n-pentylsulfonyl, isopentylsulfonyl, tert-pentylsulfonyl, neopentylsulfonyl, 2,3-dimethylpropylsulfonyl, 1-ethylpropylsulfonyl, 1-methylbutylsulfonyl, n-hexylsulfonyl, isohexylsulfonyl, or 1,1,2-trimethylpropylsulfonyl.

The groups "$(C_1-C_8)$alkyl", "$(C_2-C_8)$alkenyl", "$(C_2-C_8)$alkynyl", "$(C_3-C_8)$ cycloalkyl", "$(C_1-C_8)$alkoxy", "$(C_1-C_8)$alkylthio", "$(C_1-C_8)$alkylsulfinyl", and "$(C_1-C_8)$alkylsulfonyl" may each be substituted with one or more halogen atoms at a substitutable position or positions. When two or more halogen atoms are to be substituted, these halogen atoms may be identical or different. Each of the groups substituted with one or more halogens is expressed respectively as "halo-$(C_1-C_8)$alkyl", "halo-$(C_2-C_8)$alkenyl", "halo-$(C_2-C_8)$alkynyl", "halo-$(C_3-C_8)$ cycloalkyl", "halo-$(C_1-C_8)$alkoxy", "halo-$(C_1-C_8)$alkylthio", "halo-$(C_1-C_8)$alkylsulfinyl", or "halo-$(C_1-C_8)$alkylsulfonyl".

The groups "$(C_1-C_6)$alkyl", "$(C_2-C_6)$alkenyl", "$(C_2-C_6)$alkynyl", "$(C_3-C_6)$ cycloalkyl", "$(C_1-C_6)$alkoxy", "$(C_1-C_6)$ alkylthio", "($C_1$-$C_6$)alkylsulfinyl", and "($C_1$-$C_6$)alkylsulfonyl" may each be substituted with one or more halogen atoms at a substitutable position or positions. When two or more halogen atoms are to be substituted, these halogen atoms may be identical or different. Each of the groups substituted with one or more halogens is expressed respectively as "halo-($C_1$-$C_6$)alkyl", "halo-($C_2$-$C_6$)alkenyl", "halo-($C_2$-$C_6$)alkynyl", "halo-($C_3$-$C_6$) cycloalkyl", "halo-($C_1$-$C_6$) alkoxy", "halo-($C_1$-$C_6$)alkylthio", "halo-($C_1$-$C_6$) alkylsulfinyl", or "halo-($C_1$-$C_6$)alkylsulfonyl".

The expressions such as "($C_1$-$C_6$)", "($C_2$-$C_6$)", "($C_3$-$C_6$)", "($C_1$-$C_8$)", "($C_2$-$C_8$)", and "($C_3$-$C_8$)" refer to ranges of the number of carbon atoms of various substituents. The above definition is also applicable to a group to which the above substituents bond and, for example, "($C_3$-$C_8$)cycloalkyl($C_1$-$C_8$)alkyl" refers to a linear or branched alkyl group having 1 to 8 carbon atoms to which a cycloalkyl group having 3 to 8 carbon atoms bonds.

Non-limiting examples of the salt of the benzimidazole compound represented by General Formula (1) or (1-1) according to the present invention include inorganic acid salts such as hydrochlorides, sulfates, nitrates, and phosphates; organic acid salts such as acetates, fumarates, maleates, oxalates, methanesulfonates, benzenesulfonates, and p-toluenesulfonates; and salts with an inorganic or organic base such as sodium ion, potassium ion, calcium ion, or trimethylammonium.

The benzimidazole compound represented by General Formula (1) or (1-1), or a salt of the compound, according to the present invention may have one asymmetric center in its structural formula, and the present invention includes or covers all the optical isomers and mixtures of these isomers at any ratio.

In the benzimidazole compound represented by General Formula (1) or a salt of the compound as an active ingredient in the anticoccidial agent according to the present invention,
R is preferably (a1) ($C_1$-$C_8$)alkyl.
$R^1$ is preferably:
 (b1) ($C_1$-$C_8$)alkyl;
 (b2) halo-($C_1$-$C_8$)alkyl;
 (b3) ($C_3$-$C_8$) cycloalkyl; or
 (b6) aryl having one to five substituents selected from, identically or differently, (a) halogen, (b) ($C_1$-$C_6$) alkyl, (c) halo-($C_1$-$C_6$)alkyl, (d) ($C_1$-$C_6$)alkoxy, (e) halo-($C_1$-$C_6$)alkoxy, (f) ($C_1$-$C_6$)alkylthio, (g) halo-($C_1$-$C_6$)alkylthio, (h) ($C_1$-$C_6$)alkylsulfinyl, (i) halo-($C_1$-$C_6$)alkylsulfinyl, (j) ($C_1$-$C_6$)alkylsulfonyl, (k) halo-($C_1$-$C_6$)alkylsulfonyl, and (l) trimethylsilyl.
X is preferably O, S, or $NR^2$ where $R^2$ is as defined above.
Y is preferably (c1) halogen; and m is preferably 0 or 1.
Z is preferably, identically or differently in each occurrence, (d1) halogen; or (d2) ($C_1$-$C_8$)alkyl; and n is preferably 0, 1, or 2.

More preferably, R is (a1) ($C_1$-$C_8$)alkyl; $R^1$ is (b1) halo-($C_1$-$C_8$)alkyl; and m is 0.

Still more preferably, R is (a1) ($C_1$-$C_8$)alkyl; $R^1$ is (b1) halo-($C_1$-$C_8$)alkyl; m is 0; Zs are, identically or differently in each occurrence, (d1) halogen or (d2) ($C_1$-$C_8$)alkyl; and n is 2.

The benzimidazole compound represented by General Formula (1-1) or a salt of the compound according to the present invention is useful as an intermediate for the production of the benzimidazole compound represented by General Formula (1) or a salt of the compound.

The inventors have verified that the benzimidazole compound represented by General Formula (1) rapidly undergoes hydrolysis in the presence of water and turns to a corresponding benzimidazole compound represented by General Formula (1-1). The inventors have also verified that, when the blood of a subject animal is analyzed after administration of the benzimidazole compound represented by General Formula (1) or a salt of the compound thereto, a corresponding benzimidazole compound represented by General Formula (1-1) is detected. This indicates that the anticoccidial activity of the benzimidazole compound represented by General Formula (1) or a salt of the compound may be derived from the benzimidazole compound represented by General Formula (1-1) or a salt of the compound, which is an intermediate of the former compound. Thus, the benzimidazole compound represented by General Formula (1) or a salt of the compound is highly probably a prodrug.

In addition, it has been verified that the benzimidazole compound represented by General Formula (1-1) or a salt of the compound also has an anticoccidial activity, as demonstrated in examples mentioned later. Consequently, the benzimidazole compound represented by General Formula (1-1) or a salt of the compound itself is useful as an active ingredient in an anticoccidial agent.

In the benzimidazole compound represented by General Formula (1-1), or a salt of the compound, according to the present invention,
$R^1$ is preferably:
 (b1) ($C_1$-$C_8$)alkyl;
 (b2) halo-($C_1$-$C_8$)alkyl;
 (b3) ($C_3$-$C_8$) cycloalkyl; or
 (b6) aryl having one to five substituents selected from, identically or differently, (a) halogen, (b) ($C_1$-$C_6$) alkyl, (c) halo-($C_1$-$C_6$)alkyl, (d) ($C_1$-$C_6$)alkoxy, (e) halo-($C_1$-$C_6$)alkoxy, (f) ($C_1$-$C_6$)alkylthio, (g) halo-($C_1$-$C_6$)alkylthio, (h) ($C_1$-$C_6$)alkylsulfinyl, (i) halo-($C_1$-$C_6$)alkylsulfinyl, (j) ($C_1$-$C_6$)alkylsulfonyl, (k) halo-($C_1$-$C_6$)alkylsulfonyl, and (l) trimethylsilyl;
X is preferably O, S, or $NR^2$ where $R^2$ is as defined above;
Y is preferably (c1) halogen;
m is preferably 0 or 1;
Z is preferably, identically or differently in each occurrence, (d1) halogen; or (d2) ($C_1$-$C_8$)alkyl; and
n is preferably 0, 1, or 2.

More preferably, $R^1$ is (b1) halo-($C_1$-$C_8$)alkyl; and m is 0.

Still more preferably, $R^1$ is (b1) halo-($C_1$-$C_8$)alkyl; m is 0; Zs are, identically or differently in each occurrence, (d1) halogen; or (d2) ($C_1$-$C_8$)alkyl; and n is 2.

The benzimidazole compounds represented by General Formulae (1) and (1-1) or salts of the compounds, which work as active ingredients of the anticoccidial agents according to the present invention, can be produced typically by the following production method. The present invention, however, is not limited thereto.

Production Method 1

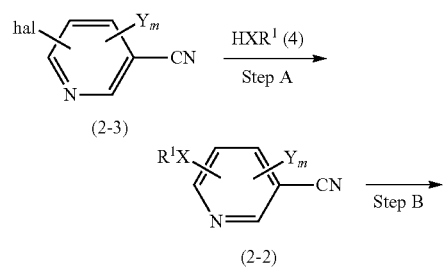

[Chem. 3]

-continued

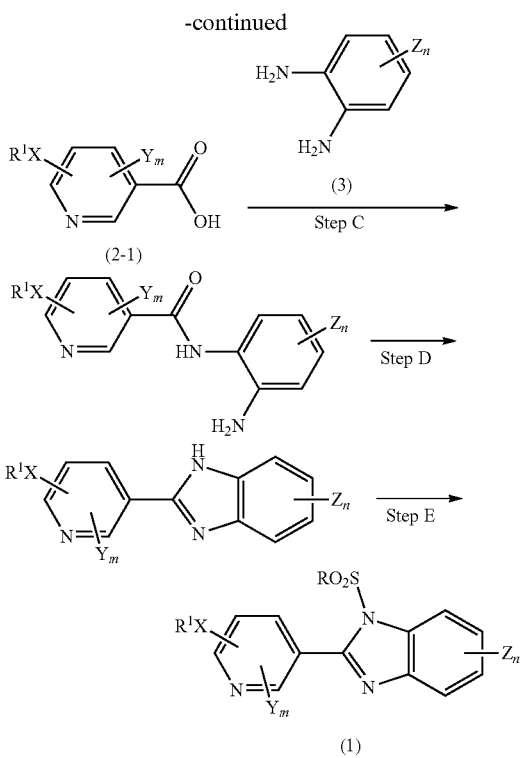

In the scheme, R, $R^1$, X, Y, Z, m, and n are as defined above; and hal represents halogen.

Production Method in Step A

A nitrile compound represented by General Formula (2-2) can be produced by reacting a compound represented by General Formula (2-3) with a compound represented by General Formula (4) in the presence of a base and an inert solvent.

Non-limiting examples of the base for use in the present reaction include inorganic bases such as sodium hydroxide, potassium hydroxide, sodium carbonate, potassium carbonate, sodium hydrogen carbonate, and potassium hydrogen carbonate; acetates such as sodium acetate and potassium acetate; alkali metal alkoxides such as potassium t-butoxide, sodium methoxide, and sodium ethoxide; tertiary amines such as triethylamine, diisopropylethylamine, and 1,8-diazabicyclo[5.4.0]undec-7-ene; and nitrogen-containing aromatic compounds such as pyridine and dimethylaminopyridine. The base is used in an amount ranging typically from 1 to 10 times the number of moles of the compound represented by General Formula (4).

The inert solvent for use in the present reaction can be any solvent, as long as it does not severely inhibit progress of the present reaction, and non-limiting examples of such inert solvents include aromatic hydrocarbons such as benzene, toluene, and xylene; halogenated hydrocarbons such as methylene chloride, chloroform, and carbon tetrachloride; halogenated aromatic hydrocarbons such as chlorobenzene and dichlorobenzene; chain or cyclic ethers such as diethyl ether, methyl tert-butyl ether, dioxane, and tetrahydrofuran; esters such as ethyl acetate; amides such as dimethylformamide and dimethylacetamide; ketones such as acetone and methyl ethyl ketone; and polar solvents such as dimethyl sulfoxide, 1,3-dimethyl-2-imidazolidinone, and N-methylpyrrolidone. Each of these inert solvents may be used alone or in combination.

The present reaction is an equimolar reaction, and thus each reactant may be used in an equal number of moles, but any of the reactants can also be used in excess. The reaction temperature can be in the range from room temperature to the boiling point of an inert solvent to be used. The reaction time may vary depending on reaction scale and reaction temperature, but can be in the range from several minutes to 48 hours.

After the completion of the reaction, the target compound may be isolated from the reaction system containing the target compound by a usual technique. Thus, the target compound can be produced, where necessary after purification typically by recrystallization or column chromatography. Alternatively, the target compound as an intermediate may undergo the subsequent step without being isolated from the reaction system.

Production Method in Step B

A carboxylic acid compound represented by General Formula (2-1) can be produced by reacting the nitrile compound represented by General Formula (2-2) in the presence of a base and an inert solvent.

Examples of the base for use in the present reaction include inorganic bases such as sodium hydroxide, potassium hydroxide, sodium carbonate, potassium carbonate, sodium hydrogen carbonate, and potassium hydrogen carbonate; and acetates such as sodium acetate and potassium acetate. The base is used in an amount ranging typically from 1 to 10 times the number of moles of the compound represented by General Formula (2-2).

The inert solvent for use in the present reaction can be any solvent, as long as it does not severely inhibit progress of the present reaction, and non-limiting example of such inert solvents include alcohols such as methanol, ethanol, propanol, and isopropanol; aromatic hydrocarbons such as benzene, toluene, and xylene; halogenated aromatic hydrocarbons such as chlorobenzene and dichlorobenzene; chain or cyclic ethers such as diethyl ether, methyl tert-butyl ether, dioxane, and tetrahydrofuran; amides such as dimethylformamide and dimethylacetamide; ketones such as acetone and methyl ethyl ketone; polar solvents such as dimethyl sulfoxide, 1,3-dimethyl-2-imidazolidinone, and N-methylpyrrolidone; as well as water. Each of these inert solvents may be used alone or in combination.

After the completion of the reaction, the target compound is isolated from the reaction system containing the target compound by a usual technique. Thus, the target compound can be produced, where necessary after purification typically by recrystallization or column chromatography.

Production Method in Step C

An amide compound represented by General Formula (2) can be produced by reacting the carboxylic acid compound represented by General Formula (2-1) with a diamino compound represented by General Formula (3) in the presence of a condensing agent, a base, and an inert solvent.

Non-limiting examples of the condensing agent for use in the present reaction include diethyl phosphorocyanidate (DEPC), carbonyldiimidazole (CDI), 1,3-dicyclohexylcarbodiimide (DCC), 1-ethyl-3-(3-dimethylaminopropyl)carbodiimide hydrochloride (EDC·HCl), chlorocarbonic esters, and 2-chloro-1-methylpyridinium iodide. The condensing agent is used in an amount appropriately selected from the range from 1 to 1.5 times the number of moles of the compound represented by General Formula (2-1).

Non-limiting examples of the base for use in the present reaction include inorganic bases such as sodium hydroxide, potassium hydroxide, sodium carbonate, potassium carbonate, sodium hydrogen carbonate, and potassium hydrogen carbonate; acetates such as sodium acetate and potassium acetate; alkali metal alkoxides such as potassium t-butoxide, sodium methoxide, and sodium ethoxide; tertiary amines such as triethylamine, diisopropylethylamine, and 1,8-diazabicyclo[5.4.0]undec-7-ene; and nitrogen-containing aromatic compounds such as pyridine and dimethylaminopyridine. The base is used in an amount ranging typically from 1 to 10 times the number of moles of the compound represented by General Formula (2-1).

The inert solvent for use in the present reaction can be any solvent, as long as it does not severely inhibit progress of the present reaction, and non-limiting examples of such inert solvents include aromatic hydrocarbons such as benzene, toluene, and xylene; halogenated hydrocarbons such as methylene chloride, chloroform, and carbon tetrachloride; halogenated aromatic hydrocarbons such as chlorobenzene and dichlorobenzene; chain or cyclic ethers such as diethyl ether, methyl tert-butyl ether, dioxane, and tetrahydrofuran; esters such as ethyl acetate; amides such as dimethylformamide and dimethylacetamide; ketones such as acetone and methyl ethyl ketone; and polar solvents such as dimethyl sulfoxide, 1,3-dimethyl-2-imidazolidinone, and N-methylpyrrolidone; as well as nitrogen-containing aromatic compounds such as pyridine. Each of these inert solvents may be used alone or in combination.

The present reaction is an equimolar reaction and thus each reactant may be used in an equal number of moles, but any of the reactants can also be used in excess. The reaction temperature can be in the range from room temperature to the boiling point of an inert solvent to be used. The reaction time may vary depending on reaction scale and reaction temperature, but can be in the range from several minutes to 48 hours.

After the completion of the reaction, the target compound is isolated from the reaction system containing the target compound by a usual technique. Thus, the target compound can be produced, where necessary after purification typically by recrystallization or column chromatography. Alternatively, the target compound (as an intermediate) may undergo the subsequent step without being isolated from the reaction system.

Production Method in Step D

A benzimidazole compound represented by General Formula (1-1) can be produced by reacting the amide compound represented by General Formula (2) in the presence of an acid and an inert solvent.

Non-limiting examples of the acid for use in the reaction include inorganic acids such as hydrochloric acid, sulfuric acid, and nitric acid; organic acids such as formic acid, acetic acid, propionic acid, trifluoroacetic acid, and benzoic acid; sulfonic acids such as methanesulfonic acid, trifluoromethanesulfonic acid, and p-toluenesulfonic acid; and phosphoric acids. The acid is used in an amount appropriately selected from the range from 0.01 to 10 times the number of moles of the amide compound represented by General Formula (2).

The inert solvent for use in the present reaction can be any solvent, as long as it does not severely inhibit progress of the present reaction, and non-limiting examples of such inert solvents include aromatic hydrocarbons such as benzene, toluene, and xylene; halogenated hydrocarbons such as methylene chloride, chloroform, and carbon tetrachloride; halogenated aromatic hydrocarbons such as chlorobenzene and dichlorobenzene; chain or cyclic ethers such as diethyl ether, methyl tert-butyl ether, dioxane, and tetrahydrofuran; esters such as ethyl acetate; amides such as dimethylformamide and dimethylacetamide; ketones such as acetone and methyl ethyl ketone; and polar solvents such as dimethyl sulfoxide, 1,3-dimethyl-2-imidazolidinone, and N-methylpyrrolidone. Each of these inert solvents may be used alone or in combination.

After the completion of the reaction, the target compound is isolated from the reaction system containing the target compound by a usual technique. Thus, the target compound can be produced, where necessary after purification typically by recrystallization or column chromatography.

Production Method in Step E

A benzimidazole compound represented by General Formula (1) can be produced by reacting the benzimidazole compound represented by General Formula (1-1) with a sulfonyl chloride represented by $RSO_2Cl$ in the presence of an inert solvent and a base.

Non-limiting examples of the base for use in the present reaction include inorganic bases such as sodium hydride, sodium hydroxide, potassium hydroxide, sodium carbonate, potassium carbonate, sodium hydrogencarbonate, and potassium hydrogencarbonate; and acetates such as sodium acetate and potassium acetate. The base is used in an amount typically in the range from 1 to 10 times the number of moles of the compound represented by General Formula (1-1).

The sulfonyl chloride represented by $RSO_2Cl$ is used in an amount typically in the range from 1 to 10 times the number of moles of the compound represented by General Formula (1-1).

The inert solvent for use in the present reaction can be any solvent, as long as it does not severely inhibit progress of the present reaction. Non-limiting examples of such inert solvents include aromatic hydrocarbons such as benzene, toluene, and xylene; halogenated hydrocarbons such as methylene chloride, chloroform, and carbon tetrachloride; halogenated aromatic hydrocarbons such as chlorobenzene and dichlorobenzene; and chain or cyclic ethers such as diethyl ether, tetrahydrofuran (THF), and dioxane. Each of these inert solvents may be used alone in combination.

The reaction temperature in the present reaction can be typically in the range from about 0° C. to the boiling point of a solvent to be used. The reaction time may vary depending on reaction scale and reaction temperature, but can be appropriately selected from the range from several minutes to 48 hours.

After the completion of the reaction, the target compound is isolated by a usual technique. Thus, the target compound can be produced, where necessary after purification typically by recrystallization or distillation.

Next, specific examples of the compound and the intermediate thereof according to the present invention are shown below. In the following tables, Me stands for methyl, Et stands for ethyl, n-Pro stands for normal propyl, n-Bu stands for normal butyl, n-Pen stands for normal pentyl, n-Hex stands for normal hexyl, c-Pro stands for cyclopropyl, c-Pen stands for cyclopentyl, c-Hep stands for cycloheptyl, Ph stands for phenyl, and TMS stands for trimethylsilyl. "Physical property" indicates a melting point (° C.) or $H^1$-NMR. $H^1$-NMR data are given in Table 5 and Table 9.

[Chem. 4]

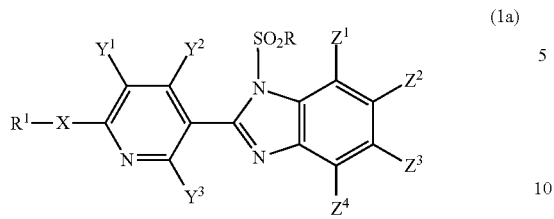

(1a)

TABLE 1

| Compound number | R¹ | X | Y¹ | Y² | Y³ | Z¹ | Z² | Z³ | Z⁴ | R | Physical property |
|---|---|---|---|---|---|---|---|---|---|---|---|
| 1-1 | CF$_3$CF$_2$CH$_2$ | O | H | H | H | H | Br | H | H | Et | 130-131 |
| 1-2 | CF$_3$CF$_2$CH$_2$ | O | H | H | H | H | H | Br | H | Et | 154-159 |
| 1-3 | CF$_3$CF$_2$CH$_2$ | O | H | H | H | H | Me | Me | H | Et | 148-149 |
| 1-4 | CF$_3$CF$_2$CH$_2$ | O | H | H | H | H | Cl | Cl | H | Et | 177-178 |
| 1-5 | CF$_3$CF$_2$CH$_2$ | O | H | H | H | H | Br | Br | H | Et | 184-186 |
| 1-6 | CF$_3$CF$_2$CH$_2$ | O | H | H | H | H | H | H | H | Me | 170-172 |
| 1-7 | CF$_3$CF$_2$CH$_2$ | O | H | H | H | H | H | H | H | Et | 105-106 |
| 1-8 | CF$_3$CF$_2$CH$_2$ | O | H | H | H | H | H | H | H | c-Pro | 97-98 |
| 1-9 | CF$_3$CF$_2$CH$_2$ | O | H | H | H | H | H | H | H | n-Bu | 86-87 |
| 1-10 | CF$_3$CF$_2$CH$_2$ | O | H | H | H | H | H | H | H | CF$_3$ | 104-106 |
| 1-11 | CF$_3$CH$_2$ | O | H | H | H | H | H | H | H | Et | 99-101 |
| 1-12 | CHF$_2$CF$_2$CH$_2$ | O | H | H | H | H | H | H | H | Et | 77-78 |
| 1-13 | CF$_3$CF$_2$CF$_2$CH$_2$ | O | H | H | H | H | H | H | H | Et | 99-101 |
| 1-14 | 4-CF$_3$SO$_2$Ph | O | H | H | H | H | H | H | H | Et | 122-123 |
| 1-15 | 4-CF$_3$SOPh | O | H | H | H | H | H | H | H | Et | 120-121 |
| 1-16 | 4-CF$_3$SPh | O | H | H | H | H | H | H | H | Et | 135-136 |
| 1-17 | 4-CF$_3$OPh | O | H | H | H | H | H | H | H | Et | 137-138 |
| 1-18 | 4-TMSPh | O | H | H | H | H | H | H | H | Et | 147-149 |
| 1-19 | n-Hex | O | H | H | H | H | H | H | H | Et | 67-68 |
| 1-20 | n-Pro | O | H | H | H | H | H | H | H | Et | 90-91 |
| 1-21 | CH$_3$OCH$_2$CH$_2$ | O | H | H | H | H | H | H | H | Et | 111-112 |
| 1-22 | c-Pen | O | H | H | H | H | H | H | H | Et | 81-82 |
| 1-23 | CF$_3$CH$_2$ | O | Cl | H | H | H | H | H | H | Et | 102-105 |
| 1-24 | CHF$_2$CF$_2$CH$_2$ | O | Cl | H | H | H | H | H | H | Et | 98-99 |
| 1-25 | CF$_3$CF$_2$CH$_2$ | O | Cl | H | H | H | H | H | H | Et | 88-90 |
| 1-26 | n-Pro | SO$_2$ | H | H | H | H | H | H | H | Et | 134-135 |
| 1-27 | n-Pro | SO | H | H | H | H | H | H | H | Et | 118-119 |
| 1-28 | n-Pro | S | H | H | H | H | H | H | H | Et | 110-111 |
| 1-29 | n-Pro | N(n-Pro) | H | H | H | H | H | H | H | Et | 102-103 |

[Chem. 5]

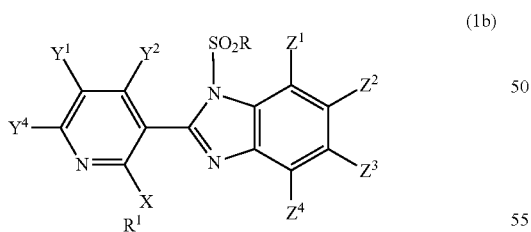

(1b)

TABLE 2

| Compound number | R¹ | X | Y¹ | Y² | Y⁴ | Z¹ | Z² | Z³ | Z⁴ | R | Physical property |
|---|---|---|---|---|---|---|---|---|---|---|---|
| 2-1 | CF$_3$CF$_2$CH$_2$ | O | H | H | H | H | H | H | H | Et | NMR |

[Chem. 6]

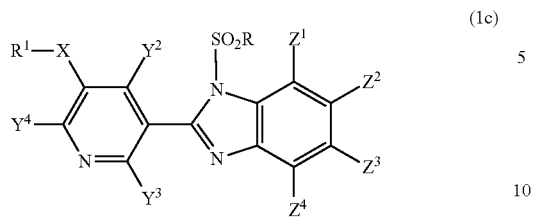

(1c)

TABLE 3

| Compound number | R¹ | X | Y² | Y³ | Y⁴ | Z¹ | Z² | Z³ | Z⁴ | R | Physical property |
|---|---|---|---|---|---|---|---|---|---|---|---|
| 3-1 | $CF_3CF_2CH_2$ | O | H | H | H | H | H | H | H | Et | 93-94 |

[Chem. 7]

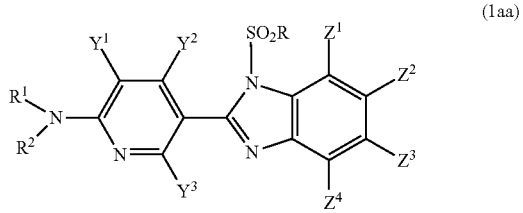

(1aa)

TABLE 4

| Compound number | N(R¹)R² | Y¹ | Y² | Y³ | Z¹ | Z² | Z³ | Z⁴ | R | Physical property |
|---|---|---|---|---|---|---|---|---|---|---|
| 4-1 | ![dioxa-azaspiro] | H | H | H | H | H | H | H | Et | NMR |

TABLE 5

| Compound number | ¹H-NMR Data (CDCl₃) |
|---|---|
| 2-1 | 8.33 (dd, 1H), 7.97-7.91 (m, 1H), 7.89-7.81 (m, 2H), 7.50-7.43 (m, 2H), 7.16 (dd, 1H), 4.89 (br, 2H), 3.32 (q, 2H), 1.21 (t, 3H) |
| 4-1 | 8.56 (d, 1H), 7.99 (dd, 1H), 7.85 (dd, 1H), 7.79 (dd, 1H), 7.40 (m, 2H), 6.68 (d, 1H), 3.66 (m, 4H), 3.11 (q, 2H), 1.67 (m, 5H), 1.51 (t, 1H), 1.04 (t, 3H) |

[Chem. 8]

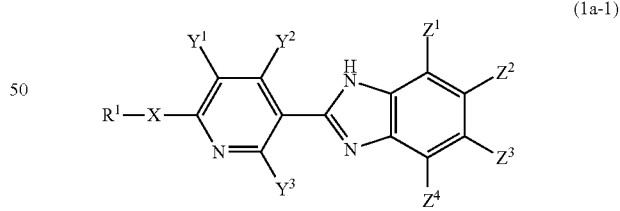

(1a-1)

TABLE 6

| Intermediate number | R¹ | X | Y¹ | Y² | Y³ | Z¹ | Z² | Z³ | Z⁴ | Physical property |
|---|---|---|---|---|---|---|---|---|---|---|
| 11-1 | $CF_3CF_2CH_2$ | O | H | H | H | H | Br | H | H | 192-193 |
| 11-3 | $CF_3CF_2CH_2$ | O | H | H | H | H | Me | Me | H | 163-165 |
| 11-4 | $CF_3CF_2CH_2$ | O | H | H | H | H | Cl | Cl | H | 198-201 |
| 11-5 | $CF_3CF_2CH_2$ | O | H | H | H | H | Br | Br | H | 218-220 |
| 11-6 | $CF_3CF_2CH_2$ | O | H | H | H | H | H | H | H | 234-239 |
| 11-11 | $CF_3CH_2$ | O | H | H | H | H | H | H | H | 247-248 |

TABLE 6-continued

| Intermediate number | R$^1$ | X | Y$^1$ | Y$^2$ | Y$^3$ | Z$^1$ | Z$^2$ | Z$^3$ | Z$^4$ | Physical property |
|---|---|---|---|---|---|---|---|---|---|---|
| 11-12 | CHF$_2$CF$_2$CH$_2$ | O | H | H | H | H | H | H | H | 186-203 |
| 11-17 | 4-CF$_3$OPh | O | H | H | H | H | H | H | H | 214-215 |
| 11-18 | 4-TMSPh | O | H | H | H | H | H | H | H | NMR |
| 11-19 | n-Hex | O | H | H | H | H | H | H | H | 170-171 |
| 11-20 | n-Pro | O | H | H | H | H | H | H | H | NMR |
| 11-21 | CH$_3$OCH$_2$CH$_2$ | O | H | H | H | H | H | H | H | NMR |
| 11-22 | c-Pen | O | H | H | H | H | H | H | H | 237-238 |
| 11-23 | CF$_3$CH$_2$ | O | Cl | H | H | H | H | H | H | 182-184 |
| 11-24 | CHF$_2$CF$_2$CH$_2$ | O | Cl | H | H | H | H | H | H | 98-99 |
| 11-26 | n-Pro | SO$_2$ | H | H | H | H | H | H | H | NMR |
| 11-27 | n-Pro | SO | H | H | H | H | H | H | H | NMR |
| 11-28 | n-Pro | S | H | H | H | H | H | H | H | 194-195 |
| 11-29 | n-Pro | N(n-Pro) | H | H | H | H | H | H | H | 187-188 |

[Chem. 9]

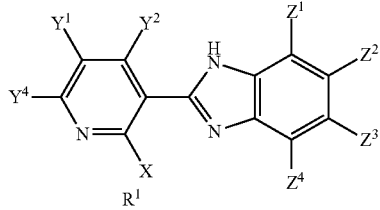

(1b-1)

TABLE 8

| Compound number | N(R$^1$)R$^2$ | Y$^1$ | Y$^2$ | Y$^3$ | Z$^1$ | Z$^2$ | Z$^3$ | Z$^4$ | Physical property |
|---|---|---|---|---|---|---|---|---|---|
| 14-1 | (spiro dioxolane piperidine) | H | H | H | H | H | H | H | NMR |

TABLE 7

| Intermediate number | R$^1$ | X | Y$^1$ | Y$^2$ | Y$^4$ | Z$^1$ | Z$^2$ | Z$^3$ | Z$^4$ | Physical property |
|---|---|---|---|---|---|---|---|---|---|---|
| 12-1 | CF$_3$CF$_2$CH$_2$ | O | H | H | H | H | H | H | H | 106-107 |

[Chem. 10]

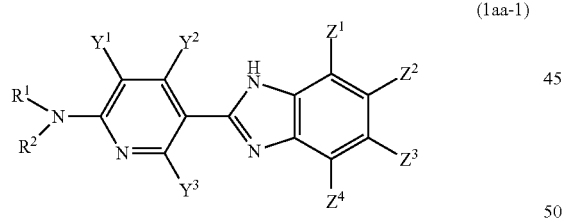

(1aa-1)

TABLE 9

| Intermediate number | $^1$H-NMR Data (solvent) |
|---|---|
| 11-18 | 11.5 (brs, 1H), 8.58-8.57 (m, 1H), 8.18-8.16 (m, 1H), 7.55-7.48 (m, 1H), 7.30-7.24 (m, 2H), 7.04-6.93 (m, 5H), 6.79-6.73 (m, 1H), 0.01 (s, 9H), (CDCl$_3$) |
| 11-20 | 12.9 (brs, 1H), 8.93-8.92 (m, 1H), 8.42-8.39 (m, 1H), 7.68-7.50 (m, 2H), 7.23-7.16 (m, 2H), 6.98 (dd, 1H), 4.30 (t, 2H), 1.78-1.75 (m, 2H), 1.00 (t, 3H), (DMSO-d$_6$) |
| 11-21 | 12.9 (brs, 1H), 8.93 (dd, 1H), 8.41 (dd, 1H), 7.68-7.63 (m, 1H), 7.55-7.50 (m, 1H), 7.25-7.16 (m, 2H), 7.02 (dd, 1H), 4.47 (t, 2H), 3.70 (t, 2H), 3.31 (s, 3H), (DMSO-d$_6$) |
| 11-26 | 12.9 (brs, 1H), 9.10-9.09 (m, 1H), 8.37-8.35 (m, 1H), 8.21 (dd, 1H), 8.02-8.00 (m, 1H), 7.90-7.88 (m, 1H), 7.54-7.51 (m, 2H), 3.46-3.42 (m, 2H), 1.86-1.80 (m, 1H), 1.07 (t, 3H), (DMSO-d$_6$) |
| 11-27 | 12.8 (brs, 1H), 8.98-8.97 (m, 1H), 8.33-8.30 (m, 1H), 8.15-8.13 (m, 1H), 8.02-8.00 (m, 1H), 7.89-7.86 (m, 1H), 7.54-7.49 (m, 2H), 3.18-3.12 (m, 1H), 2.99-2.92 (m, 1H), 2.04-1.93 (m, 1H), 1.71-1.62 (m, 1H), 1.08 (t, 3H), (DMSO-d$_6$) |

TABLE 9-continued

| Intermediate number | $^1$H-NMR Data (solvent) |
|---|---|
| 14-1 | 12.7 (brs, 1H), 8.57-8.54 (m, 1H), 8.02-7.98 (m, 1H), 7.89-7.86 (m, 1H), 7.82-7.79 (m, 1H), 7.46-7.38 (m, 2H), 6.73 (dd, 1H), 4.02 (t, 4H), 3.84-3.80 (m, 4H), 1.82-1.78 (m, 4H), (DMSO-$d_6$) |

Non-limiting examples of the animal to which the anticoccidial agent according to the present invention is applied or administered include domestic animals such as cattle, pigs, rabbits, and birds; and pets such as dogs, rabbits, and cats (hereinafter these are generically referred to as a "subject animal", where the subject animal excludes humans). The subject animal is preferably selected from birds (poultry), and more preferably selected from chickens. However, the subject animal is not limited to the above ones. As used herein, the term "control" or "anti-" refers to and includes prophylaxis and treatment.

Coccidioses are infectious diseases caused by protozoans mainly belonging to *Eimeria*, or other protozoans such as *Isospora* (described typically in Kaitei Juui-Kiseichugaku/Kiseichubyougaku (in Japanese; "Revised Veterinary Parasitology/Parasitosis"), Vol. 1, General/Protozoa, published Nov. 20, 2007, Kodansha Scientific, Ltd.).

Of coccidioses caused by *Eimeria*, chicken coccidioses are known to be caused typically by *Eimeria tenella, Eimeria acervulina, Eimeria necatrix, Eimeria brunetti, Eimeria maxima, Eimeria mivati, Eimeria mitis, Eimeria precox,* and *Eimeria hagani*; and turkey coccidioses are known to be caused typically by *Eimeria meleagrimitis, Eimeria adenoides,* and *Eimeria gallopovonis*. Coccidioses of ruminants such as cattle and sheep are known to be caused typically by *Eimeria bovis, Eimeria zuernii, Eimeria auburnensis, Eimeria ellipsoidalis, Eimeria arloingi, Eimeria ovina,* and *Eimeria parva*. Pig coccidioses are known to be caused typically by *Eimeria debliecki* and *Eimeria scabra*. Rabbit coccidioses are known to be caused typically by *Eimeria stiedai, Eimeria perforans, Eimeria magna, Eimeria media, Eimeria irresidua, Eimeria piriformis, Eimeria neoleporis, Eimeria intenstinalis,* and *Eimeria matsubayashii*. However, the *Eimeria* protozoans are not limited to the above ones.

Coccidioses caused by *Isospora* (also called Cystoisospora) are known to be caused typically by *Isospora alamataensis, Isosporan anseris, Isospora bigemina, Isospora bronchocelae, Isospora heydorni, Isospora mandari, Isospora mejiro, Isospora peromysci, Isospora rara, Isospora thibetana, Isospora canis, Isospora ohioensis, Isospora felis, Isospora rivolta,* and *Isospora suis*. The Isospora protozoans are not limited to the above ones.

Upon use of the anticoccidial agent according to the present invention, the benzimidazole compound or a salt of the compound may be used as intact without addition of any other components. In general, however, the benzimidazole compound or a salt of the compound is preferably combined with an excipient such as a solid carrier or liquid carrier, and formulated into any of preparations such as tablets, powders, granules, capsules, water-soluble powders, liquids, wettable powders (water-dispersible powders), and suspensions before use, in accordance with a common technique (such as the technique described in "Textbook of Pharmaceutics", edited by OTSUKA, Akinobu et al., 1995, Nankodo Co., Ltd.). Non-limiting examples of the excipients as solid carriers include lactose, sucrose, glucose, corn starch, gelatin, casein, starch, gum arabic, cellulose derivatives, and alginic acid. Non-limiting examples of the excipients as liquid carriers include water, glycerol, vegetable oils, fatty acids, fatty acid esters, and sorbitol.

The anticoccidial agent according to the present invention may further contain any of other components exemplified by, but not limited to, organic minerals such as peptide-zinc and peptide-iron; inorganic minerals such as zinc carbonate, manganese carbonate, iron sulfate, and magnesium carbonate; vitamins such as vitamin A, vitamin B, vitamin C, vitamin D, vitamin E, vitamin K, folic acid, pantothenic acid, and nicotinic acid; alfalfa meal; and flakes of corn. For higher palatability, a flavor, for example, may be fed simultaneously. Where necessary, the anticoccidial agent may further contain any of common additives such as antibacterial agents, antifungal agents, anthelmintics, antioxidants, coloring agents, flavoring agents, gustatory substances, and enzymes. The anticoccidial agent is preferably used after being formulated into any of preparations such as powders, granules, liquids, and tablets, by a common technique. These preparations may each contain, as an active ingredient, the benzimidazole compound or a salt of the compound typically in an amount from about 0.01 to about 95 weight percent (weight ratio).

The anticoccidial agent according to the present invention, which is formulated in the above manner, can be used as intact or after dilution typically with water. In addition or alternatively, any of other materials may be used in combination as mixing with the anticoccidial agent, or used simultaneously with, or non-simultaneously with, the anticoccidial agent. Non-limiting examples of the other materials include common additives such as antibacterial agents, antifungal agents, anthelmintics, antioxidants, coloring agents, flavoring agents, gustatory substances, and enzymes.

The administration technique of the anticoccidial agent according to the present invention to the subject animal is not limited, and may be a known technique such as scattering on, or mixing with a feed, as described later. The dose is an effective amount for anticoccidial efficacy on the subject animal, namely, such an amount that the administration of the anticoccidial agent according to the present invention increases the anticoccidial efficacy on the subject animal, as compared with the case where the anticoccidial agent is not administered, provided that the other conditions are identical.

A non-limiting example of the administration technique is the technique of mixing or gelating an active ingredient of the anticoccidial agent according to the present invention to be administered to the subject animal, and letting the subject animal freely take the mixed or gelated substance. This technique can be performed in any of a hatchery and brooder farm (e.g., poultry farm). The technique can also be performed during transportation of the poultry (subject animal) from a hatchery to a brooder farm.

Another non-limiting example of the administration technique performable herein is the technique of adding a predetermined amount of a water-soluble polysaccharide powder to the active ingredient of the anticoccidial agent according to the present invention to give a geletable preparation, diluting the preparation with water to give a gelatinous solid upon use typically in a hatchery or a brooder farm, and administering the gelatinous solid to the subject animal (namely, free feeding or direct administration into the crop).

The formulated anticoccidial agent is generally used alone, but can be used as a diluted preparation after being diluted with water (namely, administration as a dilution in drinking water). The diluted preparation contains the active ingredient(s) in a concentration of generally preferably from about 10 to 10000 ppm, and more preferably from about 35 to 5000 ppm. The diluted preparation may be administered typically by a technique of dissolving about 0.01 to about 500 g of the anticoccidial agent in 1 L of water, and dividing the solution to a dose to be administered. Preferably, about 0.035 to about 350 g of the anticoccidial agent is dissolved in 1 L of water, before administration.

The diluted preparation prepared by the above procedure may be administered to the subject animal typically using a device to add the diluted preparation to drinking water. The administration amount (liquid amount) of the diluted preparation may be determined appropriately according typically to the size, growth situation, and rearing density of the subject animal (such as poultry), and administration technique, but is generally preferably about 300 to about 2000 liters per 10000 subjects.

In the case of egg-laying birds and meat birds, the anticoccidial agent according to the present invention may be administered continuously over an entire period of rearing of the subject animal, and is preferably administered in a chick stage (e.g., a chicken of 0 to 5 weeks old after hatching).

The dose of the anticoccidial agent may be determined appropriately according typically to the type and size of the subject animal, but is preferably from 0.005 to 2 g, and more preferably from 0.005 to 1 g, in terms of total dose.

The anticoccidial agent composition according to the present invention is prepared by adding the anticoccidial agent typically to a feed, or drinking water, or a physiological electrolyte solution for animals. The amount of the anticoccidial agent to be added is preferably from about 0.005 to about 10.0 weight percent of the totality of the anticoccidial agent composition.

The feed or drinking water or physiological electrolyte solution for the subject animal, for use in the anticoccidial agent composition according to the present invention, can be any one that is commonly used and is not limited. Non-limiting examples thereof include feeds prepared by appropriately mixing components. Non-limiting examples of the components include maize (corn), rice, wheat or barley, milo, soybean cake, wheat bran, defatted rice bran, fish meal, skimmed milk powder, dried whey, fats and oils, alfalfa meal, white fish meal, soybean oil, powdered purified beef tallow, wheat flour, rapeseed oil, meat-and-bone meal (feather meal), animal fats and oils, calcium phosphate, corn gluten meal, molasses (syrup), corn germ meal, calcium carbonate, tricalcium phosphate, sodium chloride, choline chloride, vitamins (such as vitamin A, vitamin B1, vitamin B2, vitamin B6, vitamin B12, vitamin D, vitamin E, calcium pantothenate, nicotinamide, and folic acid), amino acids (such as lysine and methionine), trace inorganic salts (such as magnesium sulfate, iron sulfate, copper sulfate, zinc sulfate, potassium iodide, and cobalt sulfate), and attenuated vaccines.

The anticoccidial agent composition according to the present invention may further contain any of other components. Non-limiting examples of such other components include organic minerals such as peptide-zinc and peptide-iron; inorganic minerals such as zinc carbonate, manganese carbonate, iron sulfate, and magnesium carbonate; vitamins such as vitamin A, vitamin B, vitamin C, vitamin D, vitamin E, vitamin K, folic acid, pantothenic acid, and nicotinic acid; alfalfa meal; and flakes of corn. For higher palatability, a flavor, for example, may be fed simultaneously.

The administration technique of the anticoccidial agent composition according to the present invention to the subject animal is not limited, and may be an appropriate administration or feeding technique using a process such as scattering on, or mixing with a feed, as described later. The dose of the anticoccidial agent composition is, in short, an effective amount for anticoccidial efficacy on the subject animal, namely, such an amount that the administration of the anticoccidial agent composition according to the present invention increases the anticoccidial efficacy on the subject animal (such as poultry), as compared with the case where the anticoccidial agent composition is not administered, provided that the other conditions are identical.

In the case of egg-laying birds and meat birds, the anticoccidial agent composition according to the present invention may be administered continuously over an entire period of rearing of the subject animal, and is preferably administered in a chick stage (e.g., a chicken of 0 to 5 weeks old after hatching), and is more preferably administered continuously from 0 to 21 days after hatching.

When incorporated into a subject animal feed, the anticoccidial agent composition according to the present invention may be used in such an amount that the benzimidazole compound or a salt of the compound is present in a proportion from about 0.0005 to about 5 weight percent, and preferably from about 0.05 to about 2 weight percent. When added to drinking water or a physiological electrolyte solution before use, the anticoccidial agent composition may be used in such an amount that the benzimidazole compound or a salt of the compound is present in a proportion from about 0.035 to about 3.5 weight percent, and preferably from about 0.035 to about 1.4 weight percent.

A control method according to an embodiment of the present invention includes the step of administering, to a subject animal, an effective amount of the anticoccidial agent according to the present invention or the anticoccidial agent composition according to the present invention. In the method, the anticoccidial agent or the anticoccidial agent composition can be administered or fed to the animal by a common technique. The effective amount varies depending on conditions such as the type of each preparation, the subject animal, and the intake time period, can be selected appropriately regardless of the ranges, and can be higher than, or lower than, the above-mentioned ranges.

Specifically, for example, the anticoccidial agent according to the present invention is diluted with water to a concentration suitable for the administration to the subject animal, and the diluted agent is administered to the subject animal. The dilution degree can be determined in accordance with conventional drinking water dilution administration techniques, and is preferably from about 5 to about 10 times to give a diluted agent. Alternatively, a gelatinous solid may be administered to the subject animal (such as poultry). The gelatinous solid is prepared in the following manner. The anticoccidial agent according to the present invention is diluted with water to a predetermined concentration, this is combined with a water-soluble polysaccharide with stirring to give a homogeneous solution, and the solution stands at room temperature or is stored in a cold place (such as a refrigerator), to give the gelatinous solid. Alternatively, the gelatinous solid may be prepared using a gelling agent that melts at a high temperature and solidifies at a low temperature (such as agar or gelatin). In this case, the gelling agent is previously added to the anticoccidial agent according to the present invention. This stands at room temperature or is stored in a cold place (such as a refrigerator), to give the gelatinous solid. In the gelation, the gel strength is appropriately from about 200 to about 2000 g/cm². Assume that an agar is used as the gelling agent. In this case, the gel strength in the range corresponds to an agar concentration of about 0.5% to about 3.0%, although the agar concentration may vary depending on the type of agar to be used.

Non-limiting examples of the polysaccharide used for the gelation of the anticoccidial agent according to the present invention in the aqueous medium include agar, carrageenan, carboxymethylcellulose, starch, mannan, gelatin, sodium alginate, gum arabic, locust bean gum, xanthan gum, chitosan, guar gum, pectin, propyl alginate glycol ester, arabinogalactan, ghatti gum, tamarind seed gum, pullulan, morpholine fatty acid salts, curdlan, and gum traganth (gum tragacanth). Among these polysaccharides, agar, starch, mannan, or gelatin is particularly preferably employed, because of non-expensive, easy availability.

For example, the gelatinous solid may be administered to an about 0 to 7 day-old poultry, which takes in small amounts of drinking water and feed. This technique enables feeding of a necessary amount of the anticoccidial agent according to the present invention to the poultry for a short time in a labor-saving manner, because the poultry has a genetic program (habit) of pecking a solid on the floor to take the solid in. According to this technique, a material that is hardly administrable to such a young poultry as above can also be efficiently administered to the poultry together with the anticoccidial agent according to the present invention. This can be done by mixing the material with the anticoccidial agent according to the present invention and gelating the mixture with a water-soluble polysaccharide. Non-limiting examples of the material include attenuated vaccines, vaccines, drugs, and nutrients. During the stage of chick (young chicken), feeding of water and nutrients much significantly affects the productivity thereafter. When the nutrients are administered simultaneously with the anticoccidial agent, non-limiting examples of the nutrients include carbohydrates exemplified by saccharides such as glucose, mannose, fructose, and other monosaccharides and oligomers thereof, and sucrose and other disaccharides; proteins such as skimmed milk; and lipids; as well as vitamins, and minerals.

The anticoccidial agent according to the present invention may be used in combination with any of existing anticoccidial agents, to strengthen or supplement its effects or efficacies. In such a combination use, two or more active ingredients may be mixed and formulated into a single preparation before administration, or two or more different preparations may be prepared and administered separately.

EXAMPLES

The present invention will be illustrated in further detail with reference to production examples, formulation example, and a test example below. It should be noted, however, that the examples are by no means intended to limit the scope of the present invention.

Production Example 1

Production Example of Intermediate (2-2)
Production method of 5-cyano-2-(2,2,3,3,3-pentafluoropropoxy)pyridine

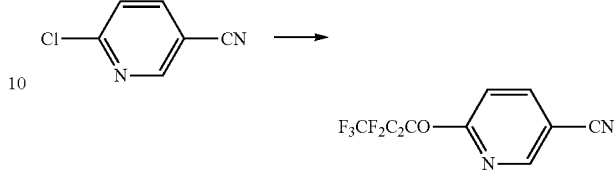

[Chem. 11]

In NMP (60 mL), 2-chloro-5-cyanopyridine (4.16 g, 30 mmol) was dissolved, the solution was combined with 2,2,3,3,3-pentafluoropropanol (6.77 g, 1.5 equivalents) and potassium carbonate (12.4 g, 3.0 equivalents), and then heated at 100° C. and reacted for 2 hours. After being cooled to room temperature, the reaction mixture was combined with water and ethyl acetate, and separated. The organic layer was washed with brine and then dried over sodium sulfate. After distilling off the solvent, the residue was purified by column chromatography and yielded the target compound (7.03 g, yield: 93%).

Production Example 2

Production method of 6-(2,2,3,3,3-pentafluoropropoxy)nicotinic acid

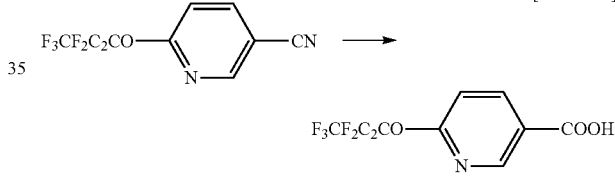

[Chem. 12]

The 5-cyano-2-(2,2,3,3,3-pentafluoropropoxy)pyridine (6.02 g, 24 mmol) obtained in the previous step was dissolved in ethanol (30 mL), and the solution was combined with water (30 mL) and sodium hydroxide (9.60 g, 10 equivalents), followed by refluxing for 2 hours. After being cooled to room temperature, the solution was neutralized, on the ice bath, with 10% hydrochloric acid added dropwise, followed by extraction with ethyl acetate. The organic layer was washed with brine and then dried over sodium sulfate. The solvent was distilled off to give a mixture mainly containing the target compound (6.40 g).

Production Example 3

Production method of 2-(6-(2,2,3,3,3-pentafluoropropoxy)pyrid-3-yl)benzimidazole (Intermediate compound 11-6)

[Chem. 13]

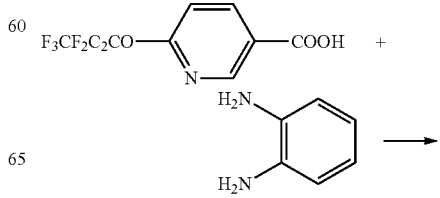

-continued

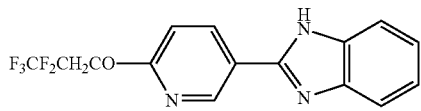

In pyridine (10 mL), 6-(2,2,3,3,3-pentafluoropropoxy) nicotinic acid (1.47 g, 5.4 mmol) was dissolved, the solution was combined with phenylenediamine (0.70 g, 1.2 equivalents), DMAP (0.13 g, 0.2 equivalents), and EDC·HCl (1.54 g, 1.5 equivalents), followed by reaction at room temperature for 3 hours. The reaction mixture was combined with water and ethyl acetate, and separated. The organic layer was washed sequentially with 10% hydrochloric acid, an aqueous potassium carbonate solution, and brine, and was dried over sodium sulfate. The solvent was distilled off, the residue was dissolved in NMP (10 mL), and the solution was combined with p-toluenesulfonic acid monohydrate (3.08 g, 3 equivalents), followed by reaction at 140° C. for 1 hour. After being cooled to room temperature, the reaction mixture was combined with an aqueous potassium carbonate solution and ethyl acetate, and separated. The organic layer was washed with brine and dried over sodium sulfate. After distilling off the solvent, the residue was purified by column chromatography, and yielded the target compound (0.67 g, melting point: 234-239° C., yield: 36% (from the previous step)).

Production Example 4

Production method of 2-(6-(2,2,3,3,3-pentafluoropropoxy)pyrid-3-yl)-1-ethanesulfonylbenzimidazole (Compound number 1-7)

[Chem. 14]

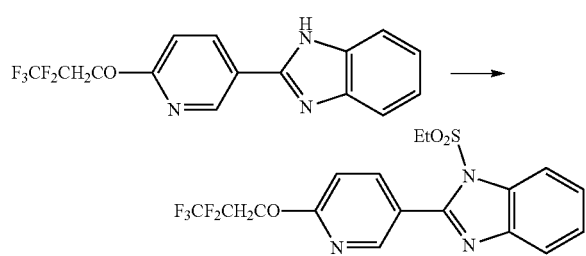

The 2-(6-(2,2,3,3,3-pentafluoropropoxy)pyrid-3-yl)benzimidazole (610 mg, 1.8 mmol) obtained in the previous step was dissolved in THF (10 mL), and the solution was combined with 60% sodium hydride (108 mg, 1.5 equivalents) at room temperature with stirring. After reacting for 10 minutes, the reaction mixture was combined with ethanesulfonyl chloride (463 mg, 2.0 equivalents), followed by reaction for 1 hour. The reaction mixture was combined sequentially with water and ethyl acetate, and separated. The organic layer was washed sequentially with an aqueous potassium carbonate solution and brine, and dried over sodium sulfate. After distilling off the solvent, the concentrated residue was purified by column chromatography and yielded the target compound (695 mg, yield: 89%).

Production Example 5

Production method of 5,6-dibromo-2-(6-(2,2,3,3,3-pentafluoropropoxy)pyrid-3-yl)benzimidazole (Intermediate compound 11-5)

[Chem. 15]

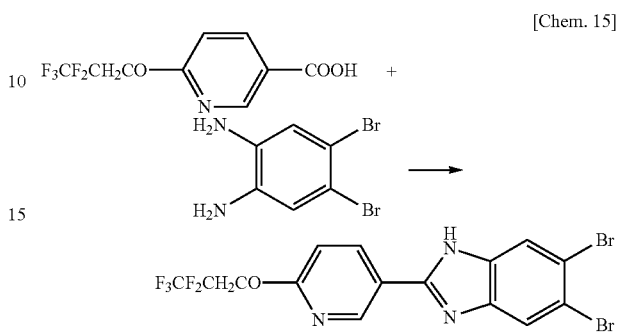

In pyridine (10 mL), 6-(2,2,3,3,3-pentafluoropropoxy) nicotinic acid (1.47 g, 5.4 mmol) was dissolved, and the solution was combined with 4,5-dibromophenylenediamine (1.72 g, 1.2 equivalents), DMAP (0.13 g, 0.2 equivalent), and EDC·HCl (1.54 g, 1.5 equivalents), followed by reaction at room temperature for 3 hours. The reaction mixture was combined with water and ethyl acetate, and separated. The organic layer was washed sequentially with 10% hydrochloric acid, an aqueous potassium carbonate solution, and brine, and dried over sodium sulfate. The solvent was distilled off, and the residue was dissolved in acetic acid (10 mL), followed by reaction with heating to reflux for 1 hour. After being cooled to room temperature, the reaction mixture was neutralized with an aqueous sodium hydroxide solution and underwent extraction with ethyl acetate. The organic layer was washed with brine and dried over sodium sulfate. After distilling off the solvent, the residue was purified by column chromatography and yielded the target compound (0.43 g, melting point: 218-220° C., yield: 16% (from the previous step)).

Formulation Example 1: Powder

In a mortar, 25 parts of a benzimidazole compound and 25 parts of lactose are mixed sufficiently, the mixture is stirred and blended thoroughly, and yields a powder.

Formulation Example 2: Granules

Twenty-five 25 parts of a benzimidazole compound is combined with 25 parts of lactose, followed by stirring and blending thoroughly. Next, the mixture is combined with an appropriate amount of water, further stirred, formed into granules using a granulator, dried by forced air drying, and yields granules.

Formulation Example 3: Wettable Powder

A wettable powder is obtained by uniformly mixing 25 parts of a benzimidazole compound, 65 parts of diatomaceous earth, 5 parts of a higher alcohol sulfuric ester, and 5 parts of an alkylnaphthalenesulfonic acid salt, and pulverizing the mixture finely.

Test Example 1: Evaluation Test of Growth Inhibition on Chicken Coccidium (*Eimeria tenella*)

Each of the benzimidazole compounds represented by General Formula (1) or salts of the compounds according to the present invention was diluted with a regulating liquid to a predetermined concentration and placed in a microtiter plate. To the dilution in the plate, mammal cells infected with a sporozoite of chicken coccidium were incubated. Forty-eight hours later, the degree of inhibition on growth of chicken coccidium to a mature schizont was examined by an indirect immunofluorescence technique, and $EC_{50}$ was determined by calculation.

As a result, of the compounds according to the present invention, Compounds 1-1, 1-2, 1-3, 1-4, 1-5, 1-6, 1-7, 1-8, 1-9, 1-10, 1-11, 1-12, 1-13, 1-14, 1-15, 1-16, 1-17, 1-18, 1-19, 1-20, 1-21, 1-22, 1-23, 1-24, 1-25, 1-26, 1-27, 1-28, 1-29, 2-1, 3-1, 4-1, 11-1, 11-3, 11-4, and 11-5 had an $EC_{50}$ of 20 µM or less. Among them, Compounds 1-2, 1-3, 1-4, 1-5, 1-6, 1-7, 1-11, 1-12, 1-13, 1-14, 1-15, 1-16, 1-17, 1-18, 1-19, 1-20, 1-22, 1-23, 1-24, 1-25, 1-26, 1-27, 1-28, 1-29, 3-1, and 4-1 had an $EC_{50}$ of 1 µM or less.

It has been verified that the compounds according to the present invention rapidly undergo hydrolysis in the presence of water and convert into corresponding intermediates. In addition, when the blood of a subject animal after the administration of the compound according to the present invention is analyzed, a corresponding intermediate is detected. This indicates that the coccidial control activities of the compounds according to the present invention may be derived from their intermediates. Thus, the compounds according to the present invention are highly probably prodrugs.

INDUSTRIAL APPLICABILITY

The present invention can provide an anticoccidial agent for use in a subject animal, where the anticoccidial agent exhibits excellent efficacies upon administration to the subject animal; and can also provide, using the anticoccidial agent, a method for using such an anticoccidial agent in a subject animal.

The invention claimed is:

1. A method for coccidial control, the method comprising administering an effective amount of a benzimidazole compound represented by General Formula (1) or (1-1) or a salt of the compound to a subject animal, General Formula (1) expressed as follows:

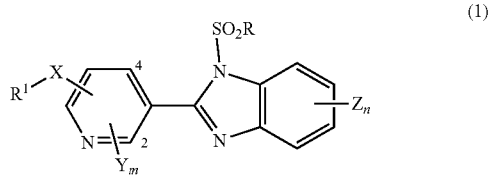

(1)

wherein:
R represents:
(a1) methyl or ethyl;
$R^1$ represents:
(b1) $(C_1-C_8)$alkyl;
(b2) halo-$(C_1-C_8)$alkyl;
(b3) $(C_3-C_8)$cycloalkyl;
(b4) $(C_1-C_8)$alkoxy$(C_1-C_8)$alkyl;
(b5) aryl; or
(b6) aryl having one to five substituents selected from, identically or differently, (a) halogen, (b) $(C_1-C_6)$alkyl, (c) halo-$(C_1-C_6)$alkyl, (d) $(C_1-C_6)$alkoxy, (e) halo-$(C_1-C_6)$alkoxy, (f) $(C_1-C_6)$alkylthio, (g) halo-$(C_1-C_6)$alkylthio, (h) $(C_1-C_6)$alkylsulfinyl, (i) halo-$(C_1-C_6)$alkylsulfinyl, (j) $(C_1-C_6)$alkylsulfonyl, (k) halo-$(C_1-C_6)$alkylsulfonyl, and (l) trimethylsilyl;

X represents O, S, SO, $SO_2$, or $NR^2$, where $R^2$ represents hydrogen, $(C_1-C_6)$alkyl, $(C_1-C_6)$alkyl-carbonyl, $(C_1-C_6)$alkoxy-carbonyl, $(C_1-C_6)$alkylsulfonyl, or halo-$(C_1-C_6)$alkylsulfonyl; or $R^2$ of $NR^2$ may combine with $R^1$ to form, with the nitrogen to which $R^2$ bonds, an unsubstituted or mono-substituted 5- to 8-membered saturated nitrogen-containing aliphatic heterocycle, where the substituent which the aliphatic heterocycle may have is ethoxycarbonyl or $(C_5-C_8)$alkylenedioxy, where two bonds of the alkylenedioxy bond to one carbon atom;

Y represents (c1) halogen;
m denotes 0 or 1;
Z represents, identically or differently in each occurrence:
(d1) halogen; or
(d2) $(C_1-C_8)$alkyl; and
n denotes 0, 1, or 2,
wherein none of the $(C_1-C_8)$alkylsulfonyl, $(C_1-C_8)$alkoxy$(C_1-C_8)$alkylsulfonyl, $(C_3-C_8)$cycloalkylsulfonyl, and halo-$(C_1-C_8)$alkylsulfonyl is present at the 2-position and the 4-position of the pyridine ring.

2. The method according to claim 1, wherein said benzimidazole compound is represented by General Formula (1) and:
R is (a1) methyl or ethyl;
$R^1$ is:
(b1) $(C_1-C_8)$alkyl;
(b2) halo-$(C_1-C_8)$alkyl;
(b3) $(C_3-C_8)$cycloalkyl; or
(b6) aryl having one to five substituents selected from, identically or differently, (a) halogen, (b) $(C_1-C_6)$alkyl, (c) halo-$(C_1-C_6)$alkyl, (d) $(C_1-C_6)$alkoxy, (e) halo-$(C_1-C_6)$alkoxy, (f) $(C_1-C_6)$alkylthio, (g) halo-$(C_1-C_6)$alkylthio, (h) $(C_1-C_6)$alkylsulfinyl, (i) halo-$(C_1-C_6)$alkylsulfinyl, (j) $(C_1-C_6)$alkylsulfonyl, (k) halo-$(C_1-C_6)$alkylsulfonyl, and (l) trimethylsilyl;
X is O, S, or $NR^2$ where $R^2$ is as defined above;
Y is (c1) halogen;
m is 0 or 1;
Z is, identically or differently in each occurrence:
(d1) halogen; or
(d2) $(C_1-C_8)$alkyl; and
n is 0, 1, or 2.

3. The method according to claim 1, wherein said benzimidazole compound is represented by General Formula (1) and:
R is (a1) methyl or ethyl;
$R^1$ is (b1) halo-$(C_1-C_8)$alkyl; and
m is 0.

4. The method according to claim 1, wherein said benzimidazole compound is represented by General Formula (1) and:
R is (a1) methyl or ethyl;
$R^1$ is (b1) halo-$(C_1-C_8)$alkyl;
m is 0;
Zs are, identically or differently in each occurrence:
(d1) halogen; or
(d2) $(C_1-C_8)$alkyl; and
n is 2.

5. The method according to claim 1, wherein the subject animal is an animal excluding humans.

6. The method according to claim 1, wherein the subject animal is a bird.

7. The method according to claim 1, wherein the subject animal is a chicken.

* * * * *